Figure 1:
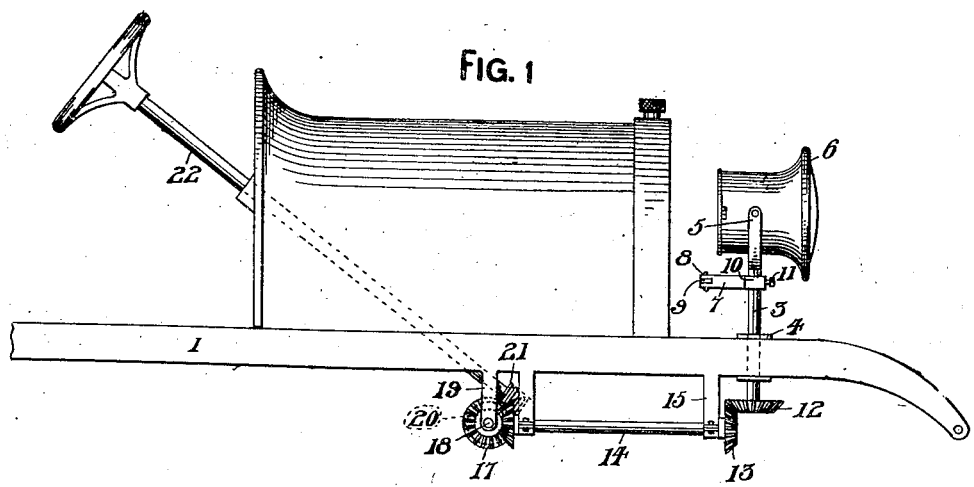

A. J. FARRELL.
ADJUSTING MECHANISM FOR LAMPS FOR AUTOMOBILES.
APPLICATION FILED MAY 5, 1911.

1,005,626.

Patented Oct. 10, 1911.

WITNESSES

INVENTOR.
A. J. Farrell
BY
ATTORNEYS

UNITED STATES PATENT OFFICE.

ARTHUR JAMES FARRELL, OF PITTSBURGH, PENNSYLVANIA.

ADJUSTING MECHANISM FOR LAMPS FOR AUTOMOBILES.

1,005,626.   Specification of Letters Patent.   Patented Oct. 10, 1911.

Application filed May 5, 1911. Serial No. 625,138.

*To all whom it may concern:*

Be it known that I, ARTHUR JAMES FARRELL, a citizen of the United States of America, residing at Pittsburgh, in the county of Allegheny and State of Pennsylvania, have invented certain new and useful Improvements in Adjusting Mechanism for Lamps for Automobiles, of which the following is a specification, reference being had therein to the accompanying drawing.

This invention relates to an adjusting mechanism for the lamps for automobiles and other vehicles, and the object of my invention is the provision of positive and reliable means in a manner as will be hereinafter set forth, whereby the lamps of an automobile can be adjusted simultaneously with the forward wheels of the vehicle to illumine the path in the direction in which the wheels are steered.

I attain the above object by a mechanical construction that is applicable to the present type of automobiles, the mechanism being simple in construction, capable of withstanding the jarring and bumping to which it is subjected, and highly efficient as a safety factor for the occupants of the vehicle and pedestrians in the vicinity of the same.

The invention will be hereinafter specifically described and then claimed, and reference will now be had to the drawing wherein:—

Figure 2:
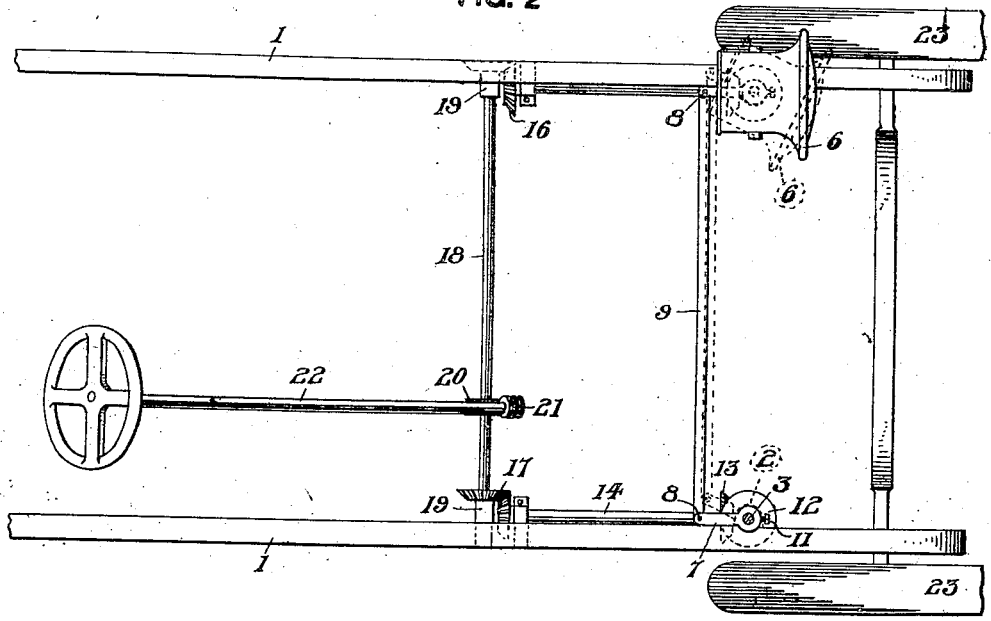

Figure 1 is a side elevation of the adjusting mechanism, and Fig. 2 is a plan of the same partly broken away and partly in section.

The reference numeral 1 denotes the side frames of an automobile, these frames adjacent to the forward ends thereof having inwardly projecting bearings 2. Rotatably mounted in the bearings 2 are vertical shafts 3, said shafts being retained within the bearings by washers 4 mounted upon said shafts above and below said bearings. The upper ends of the shafts 3 are provided with lamp holders 5 for lamps 6, and mounted upon said shafts, adjacent to the holders, are rearwardly extending cranks 7 having the rear ends thereof pivotally connected by pins 8 to a connecting bar 9. The cranks 7 have sleeves 10 to receive the shafts 3 and these sleeves are clamped to the shafts by set screws 11.

Mounted upon the lower ends of the shafts 3 are horizontal beveled gear wheels 12 meshing with beveled gear wheels 13 mounted upon the forward ends of shafts 14, journaled in hangers 15, carried by the frames 1. The rear ends of the shafts 14 have beveled gear wheels 16 meshing with similar gear wheels 17 mounted upon the transverse shaft 18, journaled in hangers 19, carried by the frames 1. The shaft 18 is provided with a gear wheel 20 and meshing with this gear wheel is a worm 21 upon the lower end of the steering post 22 of the automobile. The steering post is of the ordinary and well known type and has suitable connections for steering the forward wheels 23 of the automobile. When the post 22 is rotated a similar movement is imparted to the shafts 18 and 14, and through the medium of the beveled gear wheels the vertical lamp supporting shafts 3 are shifted, these shafts moving in unison through the medium of the connecting bar 9.

What I claim is:—

In a lamp adjusting mechanism for vehicles provided with a steering gear, a worm on the post of the steering gear, two vertical lamp supporting shafts journaled in bearings carried by the side frames of the vehicle, a beveled pinion on the lower ends of each shaft, a pair of horizontally-extending shafts journaled in hangers carried by said side frames, beveled pinions on the forward ends of said shaft and meshing with the pinions on the lower ends of the vertical shafts, beveled pinions on the rear ends of said shafts, a transversely-extending shaft journaled in hangers carried by said side frames and provided with beveled pinions meshing with the pinions on the rear ends of the horizontally-extending shafts, a worm wheel on said transverse shaft meshing with the worm on the steering post, rearwardly-extending cranks carried by said vertical shafts, and a connecting bar pivotally attached at its ends to said cranks.

In testimony whereof I affix my signature in the presence of two witnesses.

ARTHUR JAMES FARRELL.

Witnesses:
 MAX H. SROLOVITZ,
 CHRISTINA T. HOOD.

---

Copies of this patent may be obtained for five cents each, by addressing the "Commissioner of Patents, Washington, D. C."